United States Patent
Uhlendorf

[11] Patent Number: 5,086,265
[45] Date of Patent: Feb. 4, 1992

[54] ELECTRICAL CIRCUIT FOR A CENTRIFUGE

[75] Inventor: Rüdiger Uhlendorf, Niemetal-Lowenhagen, Fed. Rep. of Germany

[73] Assignee: Heraeus Sepatech GmbH, Osterode am Harz, Fed. Rep. of Germany

[21] Appl. No.: 696,034

[22] Filed: May 6, 1991

[30] Foreign Application Priority Data

May 5, 1990 [DE] Fed. Rep. of Germany ....... 4014448

[51] Int. Cl.⁵ .......................... H02P 3/24; H02P 7/63
[52] U.S. Cl. ..................... 318/817; 318/811; 318/757
[58] Field of Search ............... 318/293, 599, 746, 747, 318/748, 749, 751, 752, 786, 794, 795, 810, 811, 816, 817, 757, 759, 760

[56] References Cited

U.S. PATENT DOCUMENTS

| | | | |
|---|---|---|---|
| 3,740,629 | 6/1973 | Kohlhagen | 318/138 |
| 3,818,310 | 6/1974 | Smith | 363/63 |
| 4,733,146 | 3/1988 | Hamby | 388/847 |
| 4,734,627 | 3/1988 | Koerner | 318/138 |
| 4,972,134 | 11/1990 | Getz et al. | 318/817 |
| 4,990,839 | 2/1991 | Schonlau | 318/568.1 |
| 4,993,104 | 2/1991 | Kasper et al. | 318/447 X |
| 5,005,115 | 4/1991 | Schauder | 363/159 |

OTHER PUBLICATIONS

"Die neue Generation universell Einsetzbarer Kuhlzentrifugen", Heraeus Christ.
"Leistungselektronik", Rudolf Lappe et al., Springer-Verlag, 1988, pp. 266-281.

*Primary Examiner*—Bentsu Ro
*Attorney, Agent, or Firm*—Finnegan, Henderson, Farabow, Garrett & Dunner

[57] ABSTRACT

To control the speed of an alternating-current drive capacitor motor of a centrifuge, the motor is connected to the bridge arm of a single-phase inverter. The bridge arm is connected at each of its ends to the midpoints of a series circuit of two capacitors and two field-effect transistors, these series circuits being connected in parallel with one another and connected to the output of a rectifier operated by the a.c. voltage supply. During operation, the capacitors are discharged by means of triggering the field-effect transistors alternately via the capacitor motor, the triggering being performed via a microprocessor serving as a pulse generator.

10 Claims, 2 Drawing Sheets

5,086,265

ELECTRICAL CIRCUIT FOR A CENTRIFUGE

BACKGROUND OF THE INVENTION

This invention relates to an electrical circuit arrangement for preselecting the speed of an electric motor of a centrifuge. The circuit has an upstream inverter with a first series circuit, which consists of two controllable electronic switches constructed as field-effect transistors, connected to a direct-current source. A connection branches off between the field-effect transistors to a first terminal of the electric motor, the second terminal of the motor being connected to a second series circuit, which is also connected to a direct current source, of at least two electrical components as the tie point of these components, the triggering of the electronic switches being performed by a control logic.

In centrifuges of the type shown in brochure 2C2.85/VN Ku of Heraeus-Christ GmbH, the drive consists of an asynchronous motor, upstream of which is connected a three-phase inverter with three semiconductor bridges. The principle of construction of such an inverter is known, for example, from "Leistungselektronik" (Power Electronics) by Rudolf Lappe, Springer-Verlag, 1988, page 267 and pages 276–280. The triggering of the motor is performed from a control logic with a pulse generator, frequency divider and programmable counter, each of the six field-effect transistors being triggered via a driver and its own transformer coupling. The speed adjustment achievable with the aid of frequency dividers is set by means of a speed preselection control and checked with the aid of a display instrument. After termination of the centrifuging process, the asynchronous motor is operated as a generator, and the braking energy generated is dissipated in a separate braking resistor cooled by a fan.

The construction of the device is relatively complicated, the six electronically controlled switches requiring an equally large number of triggering elements, i.e. transformers, control signal amplifiers and a corresponding number of outputs of the control logic. The use of a microprocessor to undertake the tasks of the control logic requires a considerable programming outlay. The triggering electronics becomes very complicated, particularly when different speed ranges are to be set according to a prescribed program. A further problem is in the relatively complicated braking process, since in addition to dedicated reversing electronics, additional heat dissipation measures are required.

It is the object of the present invention therefore to provide a reduction in the number of controllable switches as well as in the control outlay and the power losses. It is a further object to provide braking of the centrifuge's drive motor without additional components such as a braking resistor or fan.

SUMMARY OF THE INVENTION

The object is achieved by providing a system for preselecting the speed of a capacitor electric motor of a centrifuge comprising a source of direct current; a first series circuit including two series connected field effect transistors, each having a control input for switching the corresponding transistor to an on and off condition, the transistors having a common connection for connecting to one terminal of the motor; a second series circuit including at least two series connected capacitors having a common connection for connecting to a second terminal of the motor; the first and second series circuit being connected in parallel across the direct current source; and a pulse generator having an output connected to the control input of both field effect transistors for applying spaced control pulses alternately to the two transistors.

BRIEF DESCRIPTION OF THE DRAWINGS

A preferred exemplary embodiment of the invention is illustrated in the following drawings and will be explained in greater detail below.

DETAILED DESCRIPTION OF THE INVENTION

Figure 1:
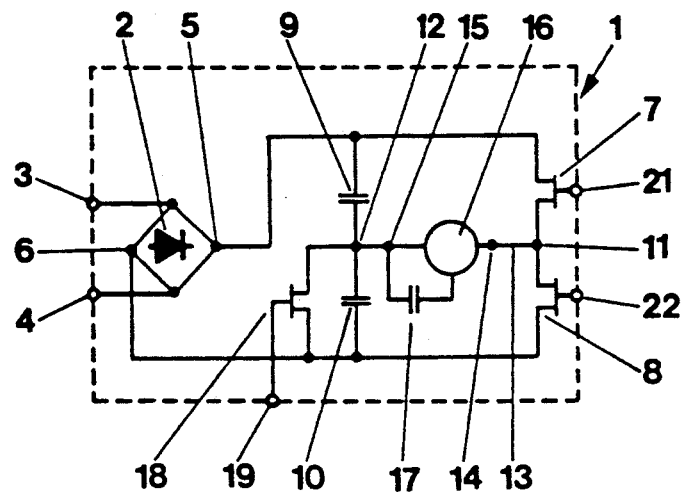
FIG. 1 shows an electrical circuit arrangement for the motor of a centrifuge having an inverter in its basic circuit.

As shown in FIG. 1, inverter 1 has a rectifier 2, which is connected by its terminals 3,4 externally to an a.c. voltage supply. Situated on the output side of rectifier 2 are terminals 5 and 6, which feed two series circuits connected in parallel with respect to one another. A first series circuit has two-field effect transistors 7,8 connected in series as an electronic switch, while the second series connection contains two capacitors 9,10 connected in series. Connected between the respective tie points 11,12 of the electronic switches 7,8 and the capacitors 9,10, respectively, is a bridge arm 13 whose terminals 14,15 are connected to the drive means of the centrifuge in the form of a capacitor motor 16 having a capacitor 17.

Tie point 12 is connected via a third field-effect transistor 18 to the output terminal 6 of rectifier 2. The control inputs of field-effect transistor is performed via control input 19. The control inputs of field-effect transistors 7,8 are denoted by the numerals 21,22.

The principle of the mode of operation of the circuit arrangement shown in FIG. 1 is explained in further detail below.

At the start of the operation, capacitors 9,10 are each charged to a direct voltage whose sum corresponds to the direct voltage applied at the output of rectifier 2, output terminal 5 conducting a positive potential and output terminal 6 a negative potential. If, now, field-effect transistor 7 is triggered via control input 21, capacitor 9 is discharged via the drain-source section of field-effect transistor 7, and the discharging current flows—seen in the positive direction—via the tie point 11 to the terminal 14 of the motor 16, and returns via the terminal 15 and the tie point 12 to the negative plate of capacitor 9. The capacitor motor 16 is thus traversed by a current proceeding from the terminal 14 in the direction of the terminal 15. After the control signal is turned off at field-effect transistor 7, the circuit discharging the capacitor 9 is opened, and the field-effect transistor 8 is triggered by a triggering signal via the control input 22. Capacitor 10 is then discharged via terminal 15, capacitor motor 16 and terminal 14 and transistor 8. In this case, the current flows—seen in the positive direction—from the terminal 15 to the terminal 14, and has thus changed its direction, so that, as seen from the motor 16, an alternating cycle consisting of a halfwave with a positive amplitude and a halfwave with a negative amplitude has been performed. After the respective discharge, a renewed charging of the capacitors is performed, so that the latter are available for a new discharging cycle.

For the purpose of braking motor 16, the third field-effect transistor 18 is continually triggered via input 19 by the output of a braking signal, so that in cooperation with field-effect transistor 7, the capacitor motor 16 in direct-current operation, and is thus immediately braked. The heat produced during braking operation in the windings of the motor, is dissipated by the fan installed in the motor.

Figure 2:
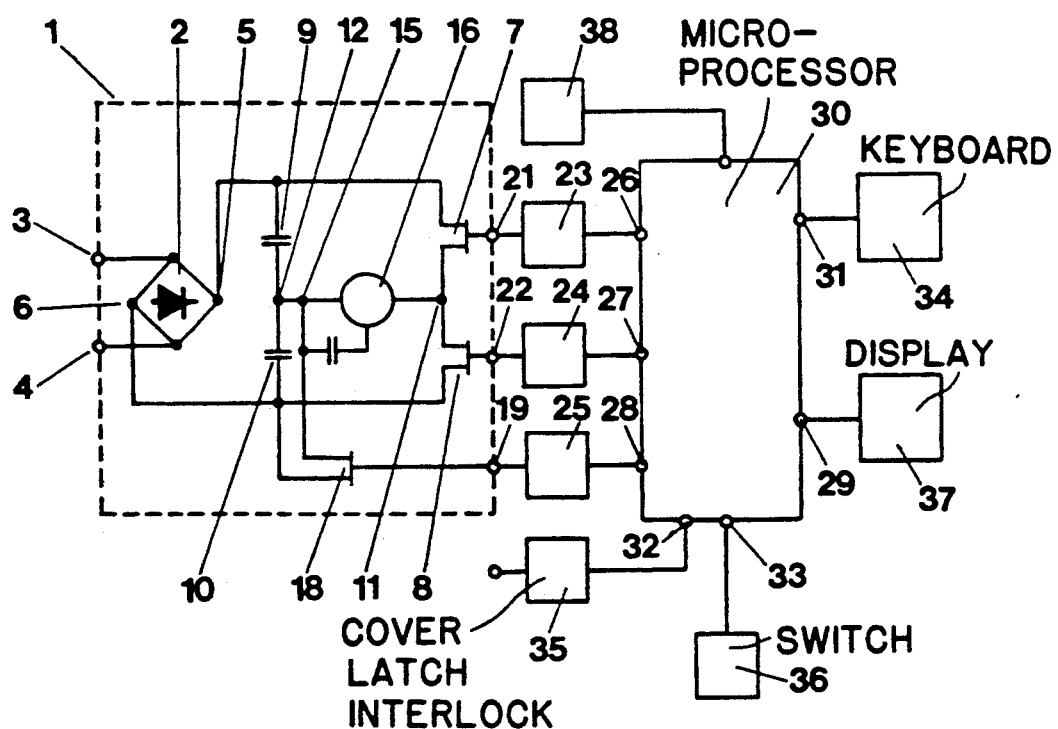
FIG. 2 shows the circuit arrangement for the inverter together with its triggering.

In accordance with FIG. 2, the triggering of the field-effect transistors 7,8,18 is performed via control elements 23,24,25, which are connected to the transistors terminals 21,22,19, respectively. This is explained in more detail with reference to FIG. 3. The control elements obtain their signals via outputs 26,27,28 of a microprocessor 30, which serves as a pulse generator and is provided with inputs 31,32 and 33, which input signals from a keyboard 34, a cover latch interlock 35 and, if appropriate, an interface 36 to microprocessor 30 for the purpose of triggering the centrifuge. The display of the respective operating state occurs via a further output terminal 29 to a display 37. The power supply of microprocessor 30 and of the control units 23,24,25 is performed via a power supply 38, which generates, for example, a voltage of 5 volts.

Figure 3:
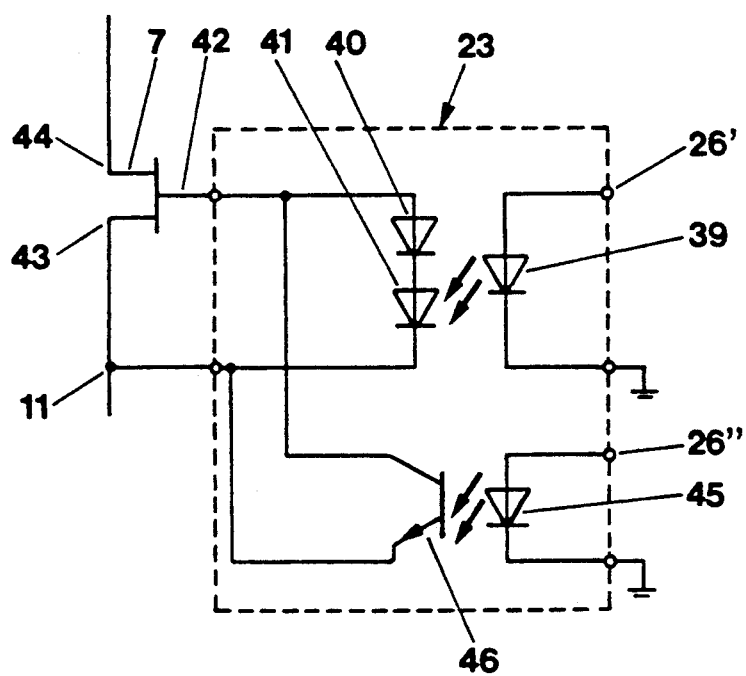
FIG. 3 shows as a portion of the control circuit for a field-effect transistor serving as a controllable switch.

FIG. 3 shows the construction of control unit 23, with its control terminal, split into 26, and 26", connected to the output 26 of microprocessor 30. The circuit arrangement shown in FIG. 3 operates as follows:

During the triggering phase, a luminescence diode 39 is operated via input 26, by an output signal of microprocessor 30 and outputs an optical signal to photodiodes 40,41, which are situated in its radiation area and are connected in a series circuit between gate 42 and source 43 of field-effect transistor 7. A sufficiently high control voltage is achieved by virtue of the series circuit of the photodiodes, so that the section between drain 44 and source 43 switches through and the field-effect transistor thereby becomes conducting. A turn-off signal illuminating a luminescence diode 45 is then sent via input 26" for the purpose of cutting off field-effect transistor 7. As a result, the base of a phototransistor 46 situated in the radiation area of luminescence diode 45 is illuminated, and the collector-emitter section of the phototransistor 46 connected in parallel with the series circuit of the diodes 40,41 is switched through, and the field-effect transistor is consequently cut off. The cutting off of the field-effect transistor is also effective during any further triggering conducted via input 26". The triggering of the field-effect transistor 8 is performed in the same way as described with reference to FIG. 3, there being, of course, a phase shift for generating the alternating-current voltage in the case of the respective control signals.

The triggering of field-effect transistor 18 for braking can be performed in principle according to the same circuit as shown in FIG. 3. However, here it is possible, to omit the function of the phototransistor, since it is not necessary in practice to have a precise turn-off instance for the braking signal. The pulses, pulse intervals and pulse repetition frequencies required for triggering are generated by the microprocessor by programming, and can be matched to the desired operational performance of the centrifuge motor by means of a data record filed in a read-only memory. It is thus possible to trigger motors having different power and speed characteristics by means of a single circuit arrangement. The programing or reprograming is performed in accordance with FIG. 3 by the interface 36 of the microprocessor.

Apart from being favorably priced in construction, the relatively high energy saving, the simple braking possibility and the possibility of triggering the braking by means of a computer program being advantageous; a further advantage is to be seen in the possibility of adjusting speeds or the speed-time functions (frequency profile) by simple reprogramming of the microprocessor serving as the pulse generator. Further an additional power supply for the triggering stages can be eliminated, since the power supply required for the microprocessor serving as the pulse generator can also be used to trigger the field-effect transistors. The circuit arrangement thus can be used for motors of different power classes by programing or reprograming the microprocessor.

What is claimed is:

1. A system for preselecting the speed of a capacitor electric motor of a centrifuge, comprising:
   a source of direct current
   a first series circuit including two series connected field effect transistors, each having a control input for switching the corresponding transistor to an on and off condition, the transistors having a common connection for connecting to one terminal of the motor;
   a second series circuit including at least two series connected capacitors having a common connection for connecting to a second terminal of the motor;
   the first and second series circuit being connected in parallel across the direct current source; and
   a pulse generator having an output connected to the control input of both field effect transistors for applying spaced control pulses alternately to the two transistors.

2. The system of claim 1, wherein the control input of each field effect transistor includes a first input for turning on the transistor and a second input for turning off the transistor.

3. The system of claim 1, wherein the control input includes at least a first photodiode for each of the transistors responsive to light pulses for controlling the corresponding transistor; and a light emitting diode responsive to the pulses of the pulse generator for providing said light pulses.

4. The system of claim 2, wherein the control input includes at least a first photodiode for each of the transistors responsive to light pulses for controlling the corresponding transistor; and a light emitting diode responsive to the pulses of the pulse generator for providing said light pulses.

5. The system of claim 3, wherein the at least first diode is connected in series with a second diode across a gate and source of each of the field effect transistor.

6. The system of claim 4, wherein the at least first diode is connected in series with a second diode across a gate and source of each of the field effect transistor.

7. The system of claim 5, further comprising a phototransistor having a collector and emitter, the collector and emitter being connected in parallel with the series connected first and second diodes; and a second light emitting diode responsive to turn-off pulses of the pulse generator for controlling the phototransistor to operate the field effect transistor to the off condition.

8. The system of claim 6, further comprising a phototransistor having a collector and emitter, the collector and emitter being connected in parallel with the series connected first and second diodes; and a second light emitting diode responsive to turn-off pulses of the pulse generator for controlling the phototransistor to operate the field effect transistor to the off condition.

9. The system of claim 1, further comprising a third field effect transistor having a control input for receiving a braking signal that is connected across the second terminal of the motor and one pole of the direct current source.

10. The system of claim 1, wherein the pulse generator includes a microprocessor.

* * * * *